United States Patent
Kuo et al.

(10) Patent No.: US 12,481,355 B2
(45) Date of Patent: Nov. 25, 2025

(54) METHOD FOR DETERMINING TWO-EYE GAZE POINT AND HOST

(71) Applicant: HTC Corporation, Taoyuan (TW)

(72) Inventors: Yan-Min Kuo, Taoyuan (TW); Jun-Lin Guo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 393 days.

(21) Appl. No.: 18/088,627

(22) Filed: Dec. 26, 2022

(65) Prior Publication Data

US 2023/0297165 A1    Sep. 21, 2023

Related U.S. Application Data

(60) Provisional application No. 63/321,113, filed on Mar. 18, 2022.

(51) Int. Cl.
*G06F 3/01* (2006.01)
*G02B 27/00* (2006.01)

(52) U.S. Cl.
CPC .......... *G06F 3/013* (2013.01); *G02B 27/0093* (2013.01)

(58) Field of Classification Search
CPC ..................................................... G06V 40/19
See application file for complete search history.

(56) References Cited

U.S. PATENT DOCUMENTS

| 10,614,303 B2 | 4/2020 | Klingström et al. |
| 11,343,420 B1* | 5/2022 | Herz ..................... G06F 3/0485 |
| 2016/0004303 A1 | 1/2016 | Arar et al. |
| 2016/0353988 A1 | 12/2016 | Moller et al. |
| 2017/0205876 A1 | 7/2017 | Vidal et al. |
| 2021/0026445 A1* | 1/2021 | Stoner ..................... G06F 3/015 |
| 2022/0207768 A1 | 6/2022 | Rosell et al. |
| 2022/0236797 A1* | 7/2022 | Drozdov ................. G06V 10/82 |
| 2022/0326967 A1* | 10/2022 | Khan ..................... G06F 3/012 |
| 2023/0104656 A1* | 4/2023 | Toivanen .................. G06T 7/73 348/79 |
| 2024/0077996 A1* | 3/2024 | Kong ...................... G06F 3/013 |

FOREIGN PATENT DOCUMENTS

| CN | 111902070 | 11/2020 |
| CN | 112000226 | 11/2020 |
| TW | 201338749 | 10/2013 |

OTHER PUBLICATIONS

"Office Action of Taiwan Counterpart Application", issued on Jan. 29, 2024, p. 1-p. 10.

* cited by examiner

*Primary Examiner* — Di Xiao
(74) *Attorney, Agent, or Firm* — JCIPRNET

(57) ABSTRACT

The embodiments of the disclosure provide a method for determining a two-eye gaze point and a host. The method includes: obtaining a first gaze point of a first eye on a reference plane and obtaining a second gaze point of a second eye on the reference plane; and determining a two-eye gaze point via combining the first gaze point and the second gaze point.

6 Claims, 3 Drawing Sheets

METHOD FOR DETERMINING TWO-EYE GAZE POINT AND HOST

CROSS-REFERENCE TO RELATED APPLICATION

This application claims the priority benefit of U.S. provisional application Ser. No. 63/321,113, filed on Mar. 18, 2022. The entirety of the above-mentioned patent application is hereby incorporated by reference herein and made a part of this specification.

BACKGROUND

1. Field of the Invention

The present disclosure generally relates to a mechanism for determining a gaze point, in particular, to a method for determining a two-eye gaze point and a host.

2. Description of Related Art

Nowadays, for providing more immersive experiences, it is common for some hosts (e.g., head-mounted display (HMD)) to perform eye tracking on the user's eyes when the user is using the reality services (e.g., the augmented reality (AR) service, the virtual reality (VR) service, and the like) provided by the hosts.

Conventionally, the hosts may determine the gaze points of the user's eye during performing the eye tracking. For example, a host (e.g., the HMD) may determine two rays (or directions) respectively originates from the two eyes of the user and accordingly determine a fused ray (or fused direction), which can be regarded as emitted/originated from somewhere between the two eyes. Once the fused ray is determined, the host can determine several reference planes in the virtual world of the reality service, and determine the intersection of the fused ray on each reference plane as the two-eye gaze point of the user on each reference plane.

For example, assuming that there are two reference planes in front of the user in the virtual world, one is spaced from the user by 1 meter and the other is spaced from the user by 2 meters, the host may determine the intersection of the fused ray on the reference plane spaced from the user by 1 meter as the 1-meter two-eye gaze point. In addition, the host may determine the intersection of the fused ray on the reference plane spaced from the user by 2 meters as the 2-meter two-eye gaze point.

That is, the conventional way for the host to determine two-eye gaze point is to firstly determine the fused ray (or fused direction) based on the rays corresponding to the two eyes of the user, and then use the fused ray to determine a two-eye gaze point on each reference plane.

However, the conventional art fails to provide a solution to determine the two-eye gaze point based on the gaze point of each eye.

SUMMARY OF THE INVENTION

Accordingly, the disclosure is directed to a method for determining a two-eye gaze point and a host, which may be used to solve the above technical problems.

The embodiments of the disclosure provide a method for determining a two-eye gaze point, adapted to a host, including: obtaining a first gaze point of a first eye on a reference plane and obtaining a second gaze point of a second eye on the reference plane; and determining a two-eye gaze point via combining the first gaze point and the second gaze point.

The embodiments of the disclosure provide a host including a storage circuit and a processor. The storage circuit stores a program code. The processor is coupled to the storage circuit and accesses the program code to perform: obtaining a first gaze point of a first eye on a reference plane and obtaining a second gaze point of a second eye on the reference plane; and determining a two-eye gaze point via combining the first gaze point and the second gaze point.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
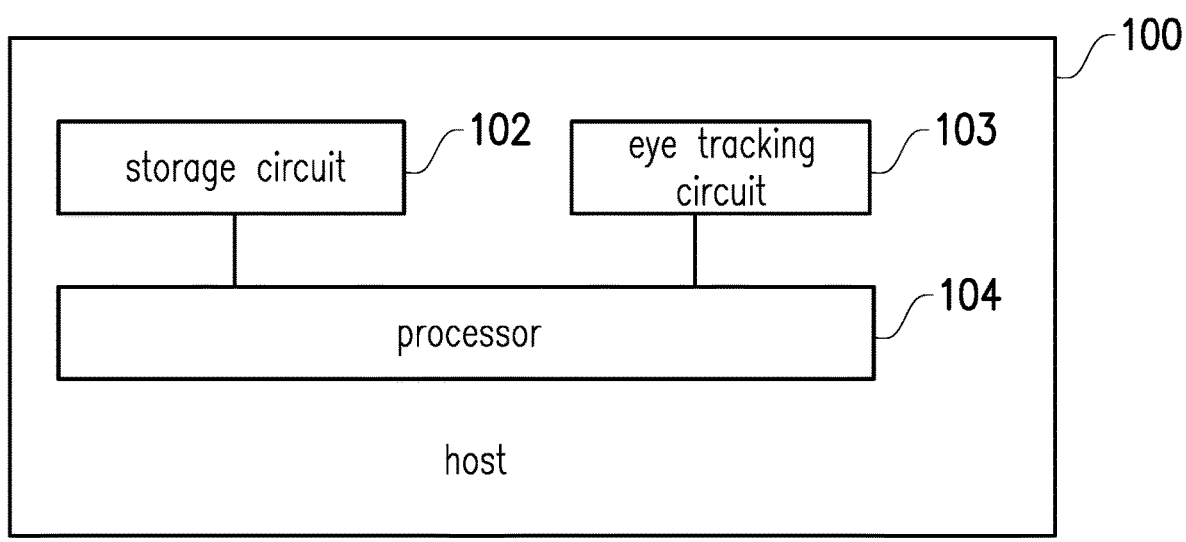
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In FIG. 1, the host 100 can be any electronic device and/or smart devices capable of performing eye tracking on the user thereof.

In one embodiment, the host 100 can be an HMD worn by the user, and the host 100 may include an eye tracking circuit 103 used to capture images of each eye of the user for the host 100 to determine the condition/movement/motion/position/status of each eye, but the disclosure is not limited thereto.

In FIG. 1, the storage circuit 102 is one or a combination of a stationary or mobile random access memory (RAM), read-only memory (ROM), flash memory, hard disk, or any other similar device, and which records a plurality of modules and/or program codes that can be executed by the processor 104.

In one embodiment, the eye tracking circuit 103 can include a camera for capturing eye images of the user for analyzing the status (e.g., gaze point) of the eyes of the user. In one embodiment, the eye tracking circuit 103 can be implemented based on the descriptions in US patent Publication No. 2019/0056599 A1, wherein laser lights can be used to scan the eyes of the user to obtain the corneal surface curvature distributions of the user's eyes. In this case, the corneal surfaces of the eyes of the user can be mapped into contour lines, and these contour lines would be changed if the corresponding eyes look at different directions. Therefore, the variation of the contour lines can be used to track the statuses of the eyes of the user.

In another embodiment, e.g. US patent Publication No. US 2016/0353988 A1 and No. US 2017/0205876A1, the eye tracking circuit 103 can include a or an array of proximity sensors disposed in front of the eyes of the user for detecting the above contour lines, and the variation of the detected contour lines can be used to track the statuses of the eyes of the user, but the disclosure is not limited thereto.

The processor 104 may be coupled with the storage circuit 102 and the eye tracking circuit 103, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules and/or program codes stored in the storage circuit 102 to implement the method for determining a two-eye gaze point provided in the disclosure, which would be further discussed in the following.

Figure 2:
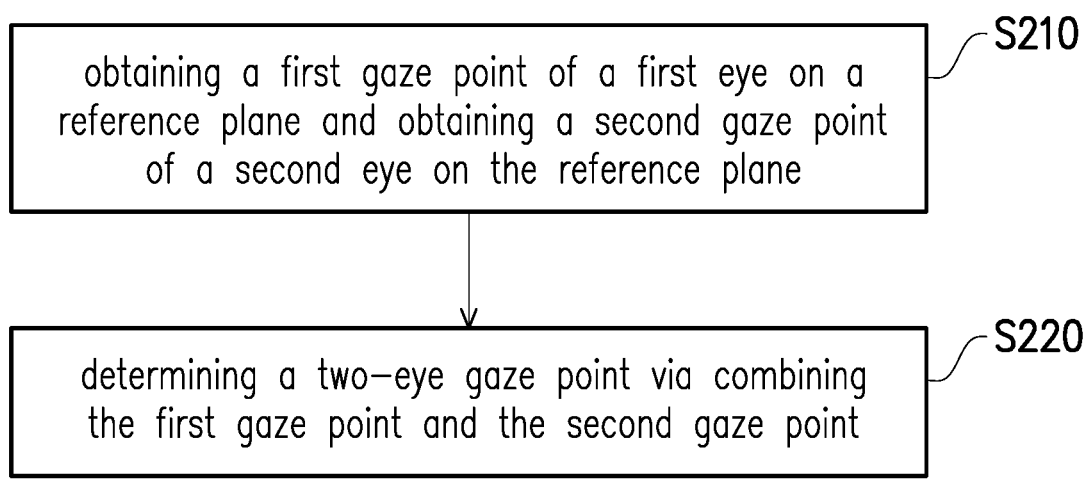
FIG. 2 shows a flow chart of the method for determining a two-eye gaze point according to an embodiment of the disclosure.

See FIG. 2, which shows a flow chart of the method for determining a two-eye gaze point according to an embodiment of the disclosure. The method of this embodiment may be executed by the host 100 in FIG. 1, and the details of each step in FIG. 2 will be described below with the components shown in FIG. 1.

In step S210, the processor 104 obtains a first gaze point of a first eye on a reference plane and obtains a second gaze point of a second eye on the reference plane.

In one embodiment, the processor 104 provides a visual content corresponding to the virtual world of the reality service provided to the user of the host 100, wherein the virtual world includes a user representative object, and the reference plane is distant from the user representative object by a predetermined distance.

In different embodiments, the predetermined distance can be determined based on the requirements of the designer. In some embodiments, the processor 104 may determine several reference planes in the virtual world, and each reference plane can be in front of the user representative object by different predetermined distances, but the disclosure is not limited thereto.

In various embodiments, the processor 104 can determine the first and second gaze points on the reference plane via any existing eye tracking technologies.

Figure 3:
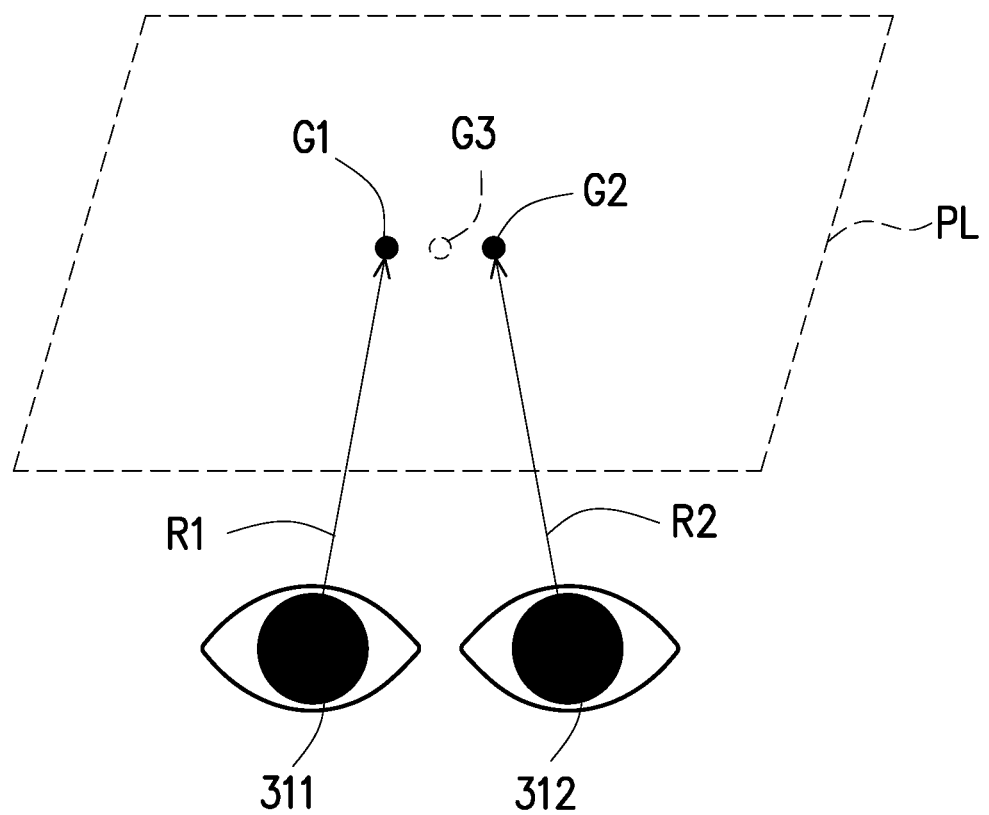
FIG. 3 shows a schematic diagram of determining gaze points according to an embodiment of the disclosure.

See FIG. 3, which shows a schematic diagram of determining gaze points according to an embodiment of the disclosure. In FIG. 3, the processor 104 can obtain a first image of the first eye 311 and accordingly determining a first ray R1 in the virtual world, wherein the first ray R1 originates (or emits) from the first eye 311. In one embodiment, the processor 104 may determine a center of the first eye 311 and a tangent plane corresponding to the center on the first eye 311. Next, the processor 104 may determine a ray originates from the center of the first eye 311 as the first ray R1 corresponding to the first eye 311, but the disclosure is not limited thereto.

After determining the first ray R1 corresponding to the first eye 311, the processor 104 can determine a first intersection point of the first ray R1 on the reference plane PL and determine the first intersection point as the first gaze point G1 of the first eye 311 on the reference plane PL, but the disclosure is not limited thereto.

In one embodiment, the processor 104 can determine the second gaze point G2 of the second eye 312 on the reference plane PL based on similar mechanisms taught in the above. For example, the processor 104 can obtain a second image of the second eye 312 and accordingly determining a second ray R2 in the virtual world, wherein the second ray R2 originates (or emits) from the second eye 312. In one embodiment, the processor 104 may determine a center of the second eye 312 and a tangent plane corresponding to the center on the second eye 312. Next, the processor 104 may determine a ray originates from the center of the second eye 312 as the second ray R2 corresponding to the second eye 312.

In the embodiments of the disclosure, the first ray R1 and the second ray R2 can be intersected at a position where the object gazed by the user locates, but the disclosure is not limited thereto.

After determining the second ray R2 corresponding to the second eye 312, the processor 104 can determine a second intersection point of the second ray R2 on the reference plane PL and determine the second intersection point as the second gaze point G2 of the second eye 312 on the reference plane PL, but the disclosure is not limited thereto.

In step S220, the processor 104 determines a two-eye gaze point G3 via combining the first gaze point G1 and the second gaze point G2.

In one embodiment, the processor 104 determine the two-eye gaze point G3 via performing a weighted combination on the first gaze point G1 and the second gaze point G2.

In various embodiments, the processor 104 can perform any combination (e.g., linear combination or non-linear combination) on the first gaze point G1 and the second gaze point G2 to obtain the two-eye gaze point G3.

In one embodiment, the processor 104 determines a first weighting corresponding to the first gaze point G1 and determines a second weighting corresponding to the second gaze point G2.

In some embodiments, the first weighting is determined based on at least one of the following quality factors: a first image recognition (for example, for recognizing pupil location in the first image capturing the first eye 311) confidence score, a first degree of variation of the continuous estimation results for the first gaze point G1, a first flatness of the pupil shape in the first image capturing the first eye 311, a first signal-to-noise ratio of the first image capturing the first eye 311, and a first clarity of the first image capturing the first eye 311.

In one embodiment, the first image recognition confidence score is a confidence score for recognizing the pupil location in the first image capturing the first eye 311, but the disclosure is not limited thereto.

In one embodiment, once the processor 104 obtains the first image of the first eye 311, the processor 104 may input the first image to a pre-trained machine learning model for determining the first gaze point G1 of the first eye 311. That is, the processor 104 may use the machine learning model to determine the first gaze point G1 based on the first image of the first eye 311 without using the method taught in FIG. 3, but the disclosure is not limited thereto. In this case, the machine learning model can provide a confidence score regarding the determination of the first gaze point G1, and the processor 104 may determine this confidence score as the first image recognition confidence score related to the first gaze point G1, but the disclosure is not limited thereto.

In an exemplary embodiment, in order for the machine learning model to have the above capabilities, during the training process of the machine learning model, the designer may feed specially designed training data into the machine learning model for the corresponding learning by the machine learning model. For example, after obtaining a certain eye image that has been labelled as corresponding a certain gaze point, the processor 104 may accordingly transform this eye image into a corresponding feature vector, and feed this feature vector into the machine learning model. Accordingly, the machine learning model can learn the features of the certain gaze point from the feature vector. In this case, when the machine learning model receives another feature vector (which may be transformed from another eye image) corresponding to the above feature vector in the future, the machine learning model may accordingly determine the corresponding gaze point and provide the corresponding confidence score, but the disclosure is not limited thereto.

In one embodiment, the processor 104 may (consecutively) collect several images of the first eye 311 and determine several gaze points based on these images. Next, the processor 104 may determine a degree of variation of the positions of these gaze points and accordingly determine this degree of variation as the first degree of variation of the first gaze point G1, but the disclosure is not limited thereto.

In one embodiment, the processor 104 may perform any existing image analysis on the first image to determine the first flatness of the first pupil shape in the first image capturing the first eye 311, the first signal-to-noise ratio of the first image capturing the first eye 311, and the first clarity of the first image capturing the first eye 311, but the disclosure is not limited thereto.

In one embodiment, the processor 104 can determine the second weighting of the second gaze point G2 of the second eye 312 on similar mechanisms taught in the above.

In some embodiments, the second weighting is determined based on at least one of the following quality factors: a second image recognition (for example, for recognizing pupil location in the first image capturing the second eye 312) confidence score, a second degree of variation of the continuous estimation results for the second gaze point G2, a second flatness of the pupil shape in the second image capturing the second eye 312, a second signal-to-noise ratio of the second image capturing the second eye 312, and a second clarity of the second image capturing the second eye 312.

In one embodiment, once the processor 104 obtains the second image of the second eye 312, the processor 104 may input the second image to the pre-trained machine learning model for determining the second gaze point G2 of the second eye 312. That is, the processor 104 may use the machine learning model to determine the second gaze point G2 based on the second image of the second eye 312 without using the method taught in FIG. 3, but the disclosure is not limited thereto. In this case, the machine learning model can provide a confidence score regarding the determination of the second gaze point G2, and the processor 104 may determine this confidence score as the second image recognition confidence score related to the second gaze point G2, but the disclosure is not limited thereto.

In one embodiment, the processor 104 may (consecutively) collect several images of the second eye 312 and determine several gaze points based on these images. Next, the processor 104 may determine a degree of variation of the positions of these gaze points and accordingly determine this degree of variation as the second degree of variation of the second gaze point G2, but the disclosure is not limited thereto.

In one embodiment, the processor 104 may perform any existing image analysis on the second image to determine the second flatness of the second pupil shape in the second image capturing the second eye 312, the second signal-to-noise ratio of the second image capturing the second eye 312, and the second clarity of the second image capturing the second eye 312, but the disclosure is not limited thereto.

In one embodiment, the first weighting is positively related to the first image recognition confidence score, the first flatness of the first pupil shape in the first image capturing the first eye 311, the first signal-to-noise ratio of the first image capturing the first eye 311, and the first clarity of the first image capturing the first eye 311. In addition, the first weighting is negatively related to the first degree of variation of the first continuously estimated gaze points G1.

In one embodiment, the second weighting is positively related to the second image recognition confidence score, the second flatness of the second pupil shape in the second image capturing the second eye 312, the second signal-to-noise ratio of the second image capturing the second eye 312, and the second clarity of the second image capturing the second eye 312. In addition, the second weighting is negatively related to the second degree of variation of the second continuously estimated gaze point G2.

In one embodiment, after determining the first weighting and the second weighting, the processor 104 performs the weighted combination on the first gaze point G1 and the second gaze point G2 based on the first weighting and the second weighting.

In one embodiment, the first gaze point G1 and the second gaze point G2 are respectively characterized by a first coordinate and a second coordinate on the reference plane PL. In this case, the processor 104 can perform the weighted combination on the first coordinate (referred to as POG1) and the second coordinate (referred to as POG2).

For example, assuming that the first weighting is w1 and the second weighting is w2, the weighted combination of the first coordinate and the second coordinate may be characterized by "(w1*POG1+w2*POG2)/(w1+w2)", but the disclosure is not limited thereto.

In one embodiment, the processor 104 regards the weighted combination of the first coordinate and the second coordinate as the coordinate of the two-eye gaze point G3 on the reference plane PL, but the disclosure is not limited thereto.

In one embodiment, the processor 104 can further show a visual cue (e.g., a dot, a cross sign or the like) corresponding to the two-eye gaze point G3 in the visual content for the user to see, but the disclosure is not limited thereto.

In summary, the embodiments of the disclosure provide a novel way to determine the two-eye gaze point based on the gaze point of each eye on the reference plane.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for determining a two-eye gaze point, adapted to a host, comprising:
   obtaining a first gaze point of a first eye on a reference plane, comprising:
      acquiring a first image of the first eye and inputting the first image into a pre-trained machine learning model to determine the first gaze point of the first eye, wherein the machine learning model further provides a first image recognition confidence score for the first gaze point;
   obtaining a second gaze point of a second eye on the reference plane, comprising:
      acquiring a second image of the second eye and inputting the second image into the pre-trained machine learning model to determine the second gaze point of the second eye, wherein the machine learning model further provides a second image recognition confidence score for the second gaze point; and
   determining a two-eye gaze point via combining the first gaze point and the second gaze point, comprising:
      performing a weighted combination of the first gaze point and the second gaze point, comprising:
         determining a first weight corresponding to the first gaze point and a second weight corresponding to the second gaze point, wherein the first weight comprises the first image recognition confidence score, and the second weight comprises the second image recognition confidence score;
         performing the weighted combination to the first gaze point and the second gaze point based on the first weight and the second weight; and
      showing a visual cue corresponding to the two-eye gaze point in a visual content.

2. The method according to claim 1, wherein the first gaze point and the second gaze point are respectively characterized by a first coordinate and a second coordinate on the reference plane, and the step of determining the two-eye gaze point via performing the weighted combination on the first gaze point and the second gaze point comprises:
   determining the two-eye gaze point via performing the weighted combination on the first coordinate and the second coordinate.

3. The method according to claim 1, further comprising:
   providing the visual content corresponding to a virtual world, wherein the virtual world comprises a user representative object, and the reference plane is distant from the user representative object by a predetermined distance.

4. A host, comprising:
   a storage circuit, storing a program code; and
   a processor, coupled to the storage circuit and accessing the program code to perform:
      obtaining a first gaze point of a first eye on a reference plane, comprising:
         acquiring a first image of the first eye and inputting the first image into a pre-trained machine learning model to determine the first gaze point of the first eye, wherein the machine learning model further provides a first image recognition confidence score for the first gaze point;
      obtaining a second gaze point of a second eye on the reference plane, comprising:
         acquiring a second image of the second eye and inputting the second image into the pre-trained machine learning model to determine the second gaze point of the second eye, wherein the machine learning model further provides a second image recognition confidence score for the second gaze point; and
      determining a two-eye gaze point via combining the first gaze point and the second gaze point, comprising:
         performing a weighted combination of the first gaze point and the second gaze point, comprising:
            determining a first weight corresponding to the first gaze point and a second weight corresponding to the second gaze point, wherein the first weight comprises the first image recognition confidence score, and the second weight comprises the second image recognition confidence score;
            performing the weighted combination to the first gaze point and the second gaze point based on the first weight and the second weight; and
         showing a visual cue corresponding to the two-eye gaze point in a visual content.

5. The host according to claim 4, wherein the first gaze point and the second gaze point are respectively characterized by a first coordinate and a second coordinate on the reference plane, and the processor performs:
   determining the two-eye gaze point via performing the weighted combination on the first coordinate and the second coordinate.

6. The host according to claim 4, wherein the processor further performs:
   providing the visual content corresponding to a virtual world, wherein the virtual world comprises a user representative object, and the reference plane is distant from the user representative object by a predetermined distance.

* * * * *